(12) United States Patent
Oh et al.

(10) Patent No.: US 6,578,567 B2
(45) Date of Patent: Jun. 17, 2003

(54) WAFER SAWING APPARATUS

(75) Inventors: Joung-Min Oh, Chungcheongnam-do (KR); Dong-Bin Kim, Chungcheongnam-do (KR); Sung-Hee Lee, Chungcheongnam-do (KR); Byeong-Soo Kim, Chungcheongnam-do (KR)

(73) Assignee: Samsung Electronics Co., Ltd. (KR)

( * ) Notice: Subject to any disclaimer, the term of this patent is extended or adjusted under 35 U.S.C. 154(b) by 37 days.

(21) Appl. No.: 09/998,771

(22) Filed: Nov. 29, 2001

(65) Prior Publication Data

US 2002/0166428 A1 Nov. 14, 2002

(30) Foreign Application Priority Data

May 10, 2001 (KR) .......................................... 2001-25409

(51) Int. Cl.[7] ................................................. B28D 1/08
(52) U.S. Cl. ............................... 125/21; 83/62.1; 451/5; 451/8; 451/9
(58) Field of Search ............................ 700/130; 451/5, 451/8, 9; 125/21, 20, 13.1; 83/62, 62.1, 861–887

(56) References Cited

U.S. PATENT DOCUMENTS

| 4,140,037 A | * | 2/1979 | Gerber ........................... 83/56 |
| 4,167,174 A | * | 9/1979 | Hampton et al. ........ 125/13.01 |
| 4,407,262 A | * | 10/1983 | Wirz et al. ................. 125/13.01 |
| 4,794,736 A | * | 1/1989 | Fuwa et al. ...................... 451/6 |
| 4,833,624 A | * | 5/1989 | Kuwahara et al. ........... 700/249 |
| 4,971,021 A | * | 11/1990 | Kubotera et al. ......... 125/13.01 |
| 5,433,649 A | * | 7/1995 | Nishida .......................... 451/5 |
| 5,836,224 A | * | 11/1998 | Gerber ............................ 83/22 |
| 6,357,330 B1 | * | 3/2002 | Dass et al. ...................... 83/863 |
| 2002/0069736 A1 | * | 6/2002 | Yasoda et al. ................ 83/62.1 |
| 2002/0085746 A1 | * | 7/2002 | Son et al. ..................... 382/151 |
| 2002/0185121 A1 | * | 12/2002 | Farnworth et al. ....... 125/23.01 |

* cited by examiner

*Primary Examiner*—Allan N. Shoap
*Assistant Examiner*—Ghassem Alie
(74) *Attorney, Agent, or Firm*—Marger Johnson & McCollom, PC

(57) ABSTRACT

A wafer sawing apparatus comprises an electrically conductive chuck table surrounding a suction plate and tactile sensing lines formed on the upper surface of the suction plate. At least one end of each tactile sensing line is electrically connected to the table body. A controller controls the chuck table and a scribing blade. The controller is electrically connected to both elements. The controller comprises a tactile sensing unit connected to the table body for sensing contact of the scribing blade with the tactile sensing lines or the table body and an equipment stop unit for stopping the scribing blade. The controller further comprises a zero point adjusting unit for receiving a contact signal from the tactile sensing unit and for adjusting a zero point of the scribing blade, and a switching unit connecting the tactile sensing unit to the zero point adjusting unit or the equipment stop unit.

12 Claims, 7 Drawing Sheets

WAFER SAWING APPARATUS

RELATED APPLICATION

This application relies for priority upon Korean Patent Application No. 2001-25409, filed on May 10, 2001, the contents of which are herein incorporated by reference in their entirety.

BACKGROUND OF THE INVENTION

1. Field of the Invention

The present invention relates to the field of semiconductor manufacturing and, more particularly to a wafer sawing apparatus.

2. Description of the Related Art

As well known in the field, a semiconductor product is manufactured by a series of steps of semiconductor wafer fabrication, packaging, and test. Through the wafer fabrication, circuits or devices are formed on a surface of a semiconductor wafer. Then, the processed wafer is sawed (singulated) into individual semiconductor chips. Each of the individual chips subsequently is subsequently assembled in a package.

In the conventional wafer-sawing step, the wafer is mounted on a chuck table and sawed with a diamond-headed blade. A full-cutting method is used in order to easily separate the chips on the wafer into individual chips. In the full-cutting method case, an adhesive tape is attached to the back surface of the wafer and both are cut. Therefore, the scribing blade is set to have a predetermined cutting depth, so as to completely cut the wafer or to partially cut the adhesive tape by approximately 20%.

Since the adhesive tape is of a thickness of only roughly 30–70 microns and the wafer is of a thickness of only several hundred microns, it is difficult to precisely control the cutting depth. Even if the cutting depth of the scribing blade is controlled, numeric error of the cutting depth may easily occur. Moreover, data input errors of only several microns to several dozen microns can cause wafer cutting failures.

Further, inconsistent abrasion rates of the scribing blade also cause the wafer cutting failures.

If the cutting depth of the scribing blade is set to be more than the total thickness of the wafer and the adhesive tape, the scribing blade may damage the chuck table.

Since the wafer cutting failures affect multiple stacked wafers, they are fatally defective errors.

SUMMARY OF THE INVENTION

Accordingly, an object of the present invention is to prevent wafer cutting failures due to over-sawing of the wafer and to prevent the chuck table from being damaged by the scribing blade.

The foregoing and other objects are achieved by a wafer sawing apparatus comprising a chuck table including a wafer suction plate for mounting and retaining a wafer, an electrically conductive table body surrounding the wafer suction plate, and tactile sensing lines being formed on the upper surface of the wafer suction plate, at least one end of the tactile sensing line being electrically connected to the table body. A scribing blade for sawing the wafer is mounted on the chuck table; a controller, for controlling the chuck table and the scribing blade, is electrically connected to the table body of the chuck table and the scribing blade. The controller comprises a tactile sensing unit for sensing the contact of the scribing blade with the tactile sensing lines or the table body, the tactile sensing unit being connected to the table body; and an equipment stop unit for stopping the driving of the scribing blade by receiving a signal of the contact of the scribing blade with the tactile sensing lines from the tactile sensing unit.

The controller of the present invention further comprises a zero point adjusting unit for receiving the signal of the contact from the tactile sensing unit and for adjusting a zero point of the scribing blade; and a switching unit for opening or closing a connection between the tactile sensing unit and the zero point adjusting unit or a connection between the tactile sensing unit and the equipment stop unit. In adjusting the zero point, the switching unit connects the tactile sensing unit to the zero point adjusting unit, and then in sawing the wafer, the switching unit connects the tactile sensing unit to the equipment stop unit.

The tactile sensing lines comprises at least one first tactile sensing line intersecting with horizontal scribe lines along which the scribing blade saws the wafer; and at least one second tactile sensing line intersecting with vertical scribe lines along which the scribing blade saws the wafer.

In a first preferred aspect of the present invention, the first tactile sensing line is perpendicular to the horizontal scribe lines of the wafer and the second tactile sensing line is perpendicular to the vertical scribe lines of the wafer.

In a second preferred aspect of the present invention, a plurality of tactile sensing lines form a substantially bounding the sawing area.

In a third preferred aspect of the present invention, the tactile sensing lines comprises a first tactile sensing line in a circle substantially encircling the area formed by connecting two outermost vertical scribe lines and two outermost horizontal scribe lines of the wafer; and a second tactile sensing line for connecting the first tactile sensing line to the table body.

In accordance with the preferred embodiments of the present invention, since the tactile sensing lines on the chuck table senses a contact of the scribing blade with the wafer suction plate of the chuck table due to the over-sawing of the scribing blade on the wafer, the wafer sawing apparatus of the present invention prevents wafer cutting failures and prevents the chuck table from being damaged by a scribing blade.

BRIEF DESCRIPTION OF THE DRAWINGS

These and other objects, features and advantages of the present invention will be readily understood with reference to the following detailed description thereof provided in conjunction with the accompanying drawings, wherein like reference numerals designate like structural elements, and, in which.

DETAILED DESCRIPTION OF THE PREFERRED EMBODIMENTS

Figure 1:
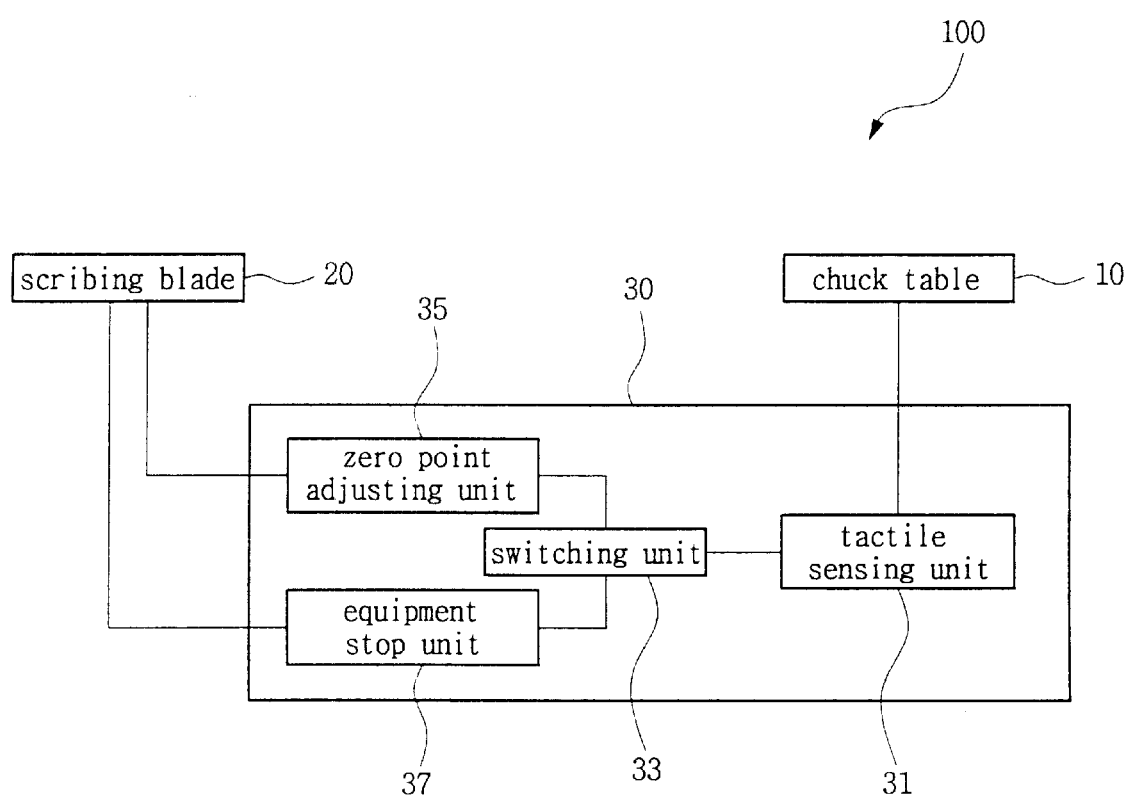
FIG. 1 is a block diagram of a wafer sawing apparatus having a chuck table with tactile sensing lines in accordance with the present invention.

Preferred embodiments of the present invention will be described below with reference to the accompanying drawings.

With reference to FIGS. 1 through 4, a wafer sawing apparatus 100 comprises a chuck table 10, a scribing blade 20 and a controller 30. The chuck table 10 serves to chuck and to align a wafer thereon, and is controlled by the controller 30. The scribing blade 20 saws or slices the wafer mounted on the chuck table 10 into individual semiconductor chips. Conventionally, a diamond-headed blade is used as the scribing blade 20. The scribing blade 20 is controlled by the controller 30. Additionally, the scribing blade 20 is grounded. The controller 30 is electrically connected to the chuck table 10 and the scribing blade 20, and controls the chuck table 10 and the scribing blade 20. The controller 30 comprises a tactile sensing unit 31, a zero point adjusting unit 35, a switching unit 33, and an equipment stop unit 37.

The tactile sensing unit 31 is electrically connected to the chuck table 10 and senses whether the scribing blade 20 contacts the chuck table 10. The switching unit 33 selectively transmits data sensed from the tactile sensing unit 31 into the zero point adjusting unit 35 or into the equipment stop unit 37. The zero point adjusting unit 35 is electrically connected to the scribing blade 20 to control the zero point of the scribing blade 20. The equipment stop unit 37 is electrically connected to the scribing blade 20 to control the operation of the scribing blade 20.

In controlling the zero point of the scribing blade 20, the switching unit 33 connects the tactile sensing unit 31 to the zero point adjusting unit 35. In wafer-sawing, after the zero point adjusting, the switching unit 33 connects the tactile sensing unit 31 to the equipment stop unit 37. Upon electrically sensing the over-sawing of the scribing blade, i.e., the contact of the scribing blade 20 on the chuck table 10, the equipment stop unit 37 stops the operation of the scribing blade 20.

Figure 2:
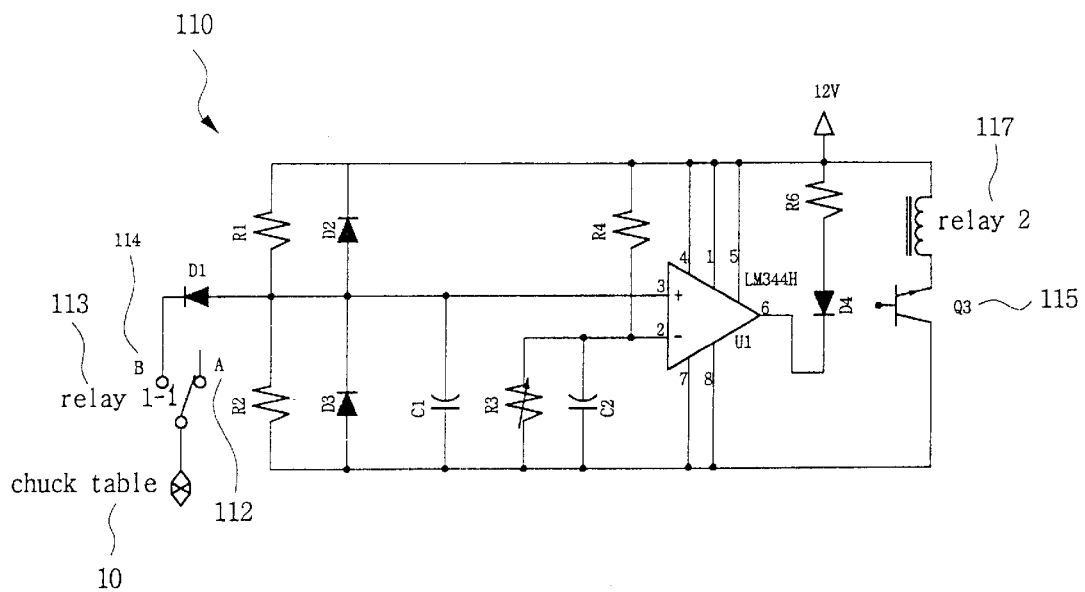
FIG. 2 is a diagram of a circuit for sensing a contact of a tactile sensing unit of FIG. 1.

FIG. 2 shows a tactile sensing circuit 110 of the tactile sensing unit 31 of FIG. 1. When one end of a relay 1-1 113 is connected to point A 112, the wafer sawing apparatus stops. When the end of the relay 1-1 113 is connected to point B 114, the tactile sensing circuit 110 stands by. Another end of the relay 1-1 113 is connected to the chuck table 10. A voltage of 5V is supplied to the chuck table 10. Therefore, as long as the scribing blade does not contact the chuck table 10, the tactile sensing circuit 110 is maintained in the stand-by condition.

When the scribing blade 20 contacts the chuck table 10, power is supplied to the scribing blade 20 and outputted through Q3 115. As a result, the contact is sensed and the zero point of the scribing blade 20 is adjusted. The present invention comprises a relay 2 117. The relay 2 117 does not operate in zero point adjusting, but does operate in contacting of the scribing blade 20 to the chuck table 10, then drives the equipment stop circuit 130 of FIG. 4, thereby stopping the sawing apparatus 100.

Figure 3:
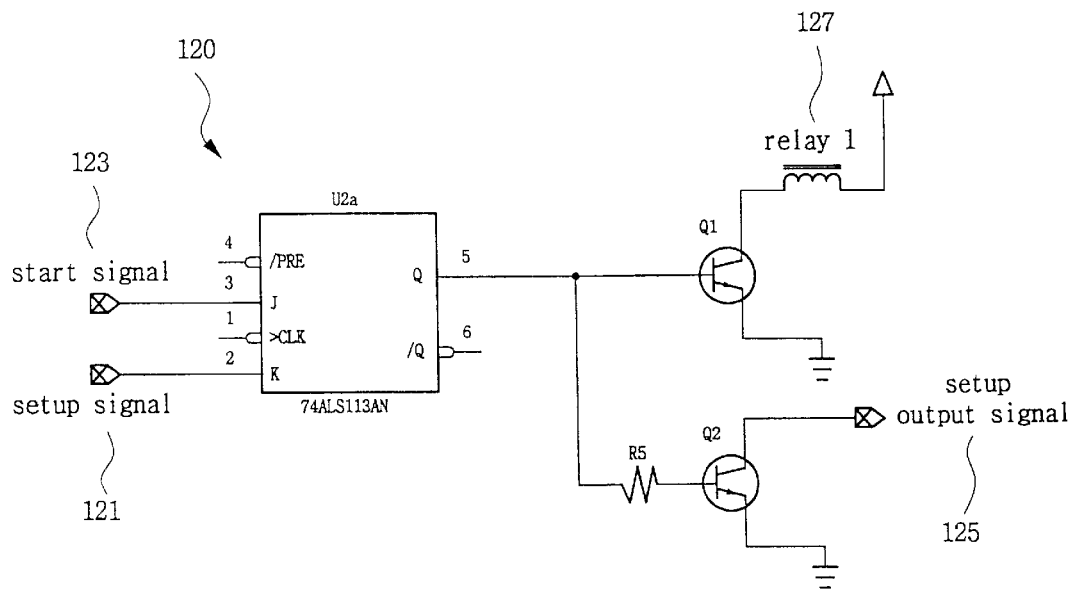
FIG. 3 is a diagram of a circuit for driving the circuit of FIG. 2 during a zero point adjusting step and a sawing step.

FIG. 3 is a circuit diagram 120 for driving the tactile sensing circuit 110 of FIG. 2 in order to sense the contact of the scribing blade to the chuck table in the zero point adjusting step and the wafer-sawing step. In the zero point adjusting, a setup signal 121 is inputted. In wafer sawing, a start signal 123 is inputted. If either one of the setup signal 121 or the start signal 123 is inputted, a setup output signal 125 is changed into "0"and the relay 1 127 operates, thereby changing the relay 1-1 113 to be connected to the point B 114.

Figure 4:
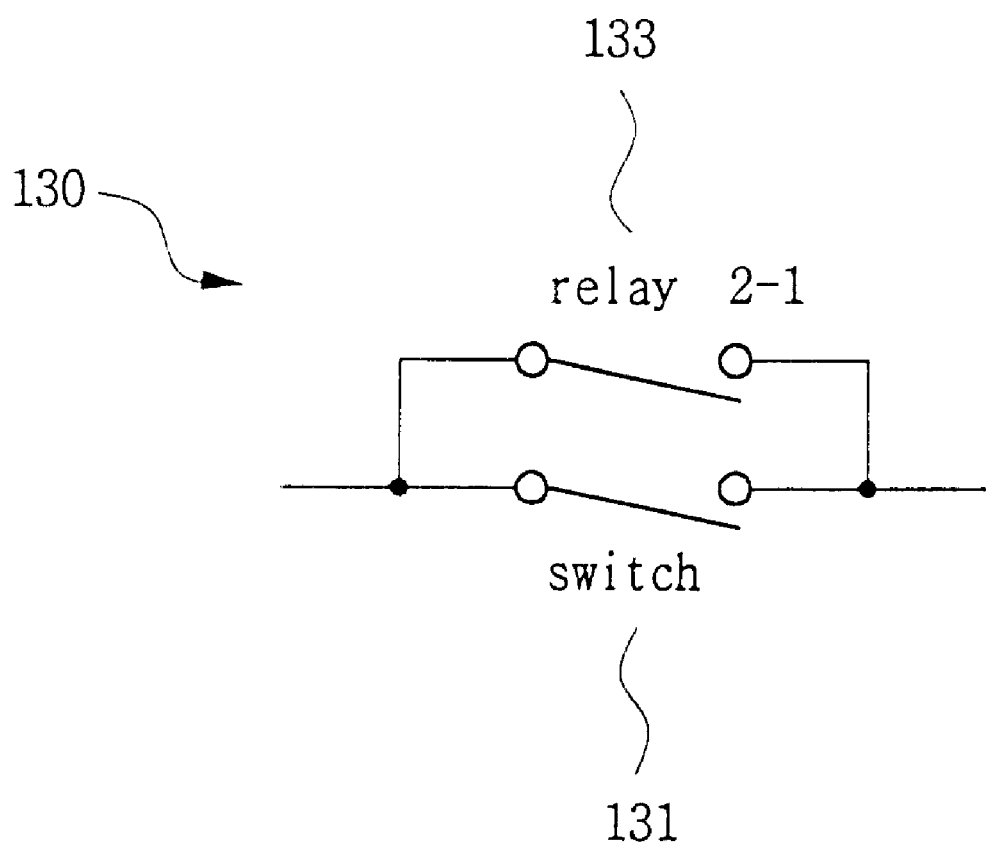
FIG. 4 is a circuit diagram for activating the equipment stop unit of FIG. 1.

FIG. 4 shows an equipment stop circuit 130 of the equipment stop unit 37 of FIG. 1. A switch 131 permits an operator to manually halt the sawing apparatus by. A relay 2-1 133 operates by the operation of the relay 2 117 of FIG. 2. That is, in the wafer sawing step, when the scribing blade 20 contacts the chuck table 10, the relay 2 117 operates and the relay 2-1 133 closes, thereby stopping the sawing apparatus.

Figure 5:
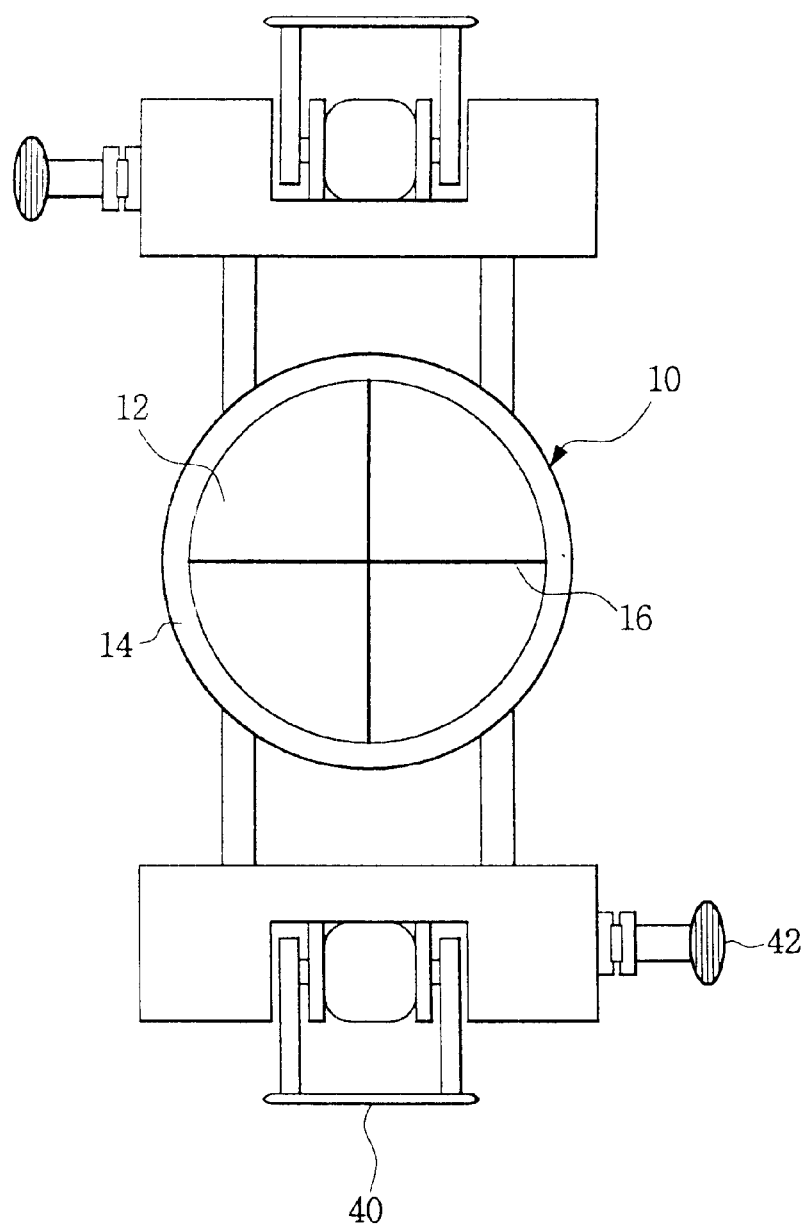
FIG. 5 is a plan view of a wafer sawing apparatus having a chuck table with tactile sensing lines in accordance with a first embodiment of the present invention.
Figure 6:
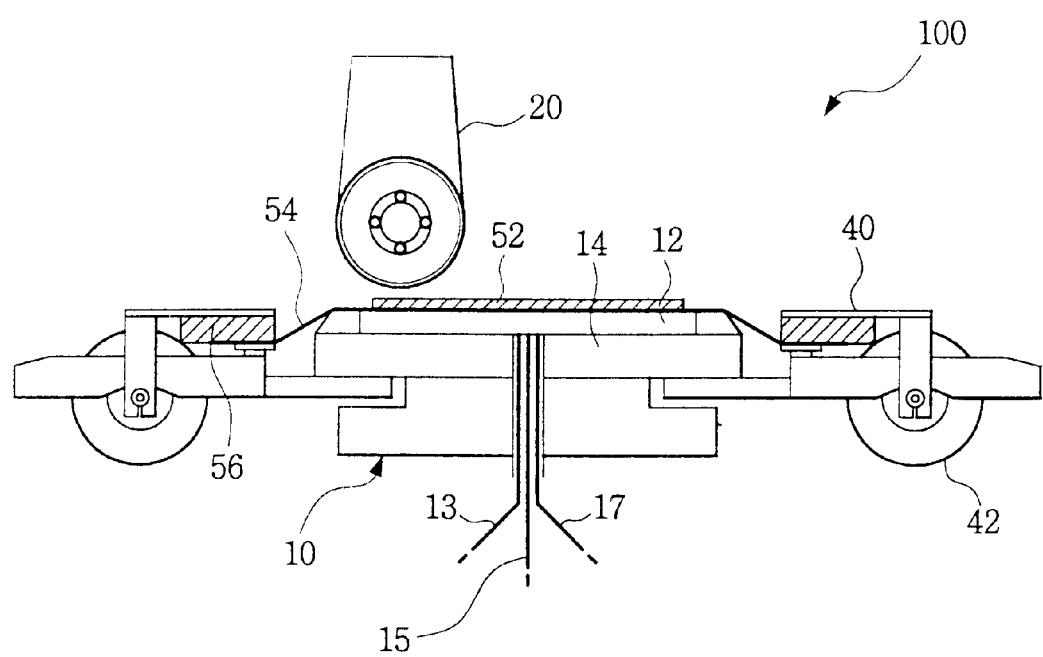
FIG. 6 is a front view of the wafer sawing apparatus of FIG. 5.
Figure 7:
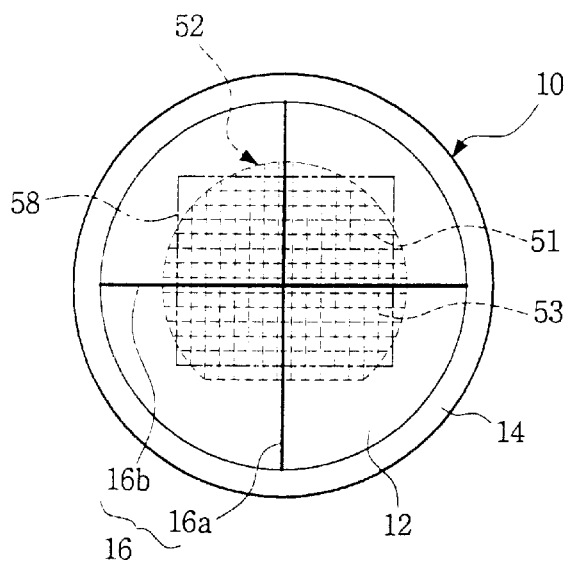
FIG. 7 is an enlarged plan view of a wafer mounted on the chuck table of FIG. 5.

FIGS. 5 to 7 show a chuck table 10 with a sensing means for sensing the contact of the scribing blade 20 with the chuck table 10 in accordance with a first embodiment of the present invention. The chuck table 10 comprises a table body 14, a wafer suction plate 12 and a ring clamp 40. Tactile sensing lines 16 are formed on the upper surface of the wafer suction plate 12.

A recess for receiving the wafer suction plate 12 in a circle shape is formed on the table body 14 at the center. The table body 14 is made of a conductive material to be electrically connected to the tactile sensing unit 31 (FIG. 1) of the controller 30. A signal line 15 electrically connects the chuck table 10 to the controller 30 (FIG. 1), and further electrically connects the table body 14 to the tactile sensing unit 31 (FIG. 1) of the controller 30.

The wafer suction table 12 is formed on the upper surface of the table body 14 and serves to retain the wafer 52. The wafer suction table 12 is made of non-conductive material, for example, a porous non-conductive material. Provided in the wafer suction table 12 is a line 17 for supplying vacuum condition to retain (suck) the wafer 52 by negative pressure, and a line 13 for supplying air so as to separate the wafer 52 from the wafer suction plate 12.

The ring clamp 40 fixes a fixing ring 56 having the wafer 52 attached to the center of the fixing ring 56. In order to more easily execute the wafer sawing and chip attachment steps, the wafer 52 is fixed with an adhesive tape 54 to the center of the fixing ring 56 having dimensions larger than that of the wafer 52 itself. When the fixing ring 56 with the affixed wafer 52 is transferred to the chuck table 10, the surface to which the wafer 52 is attached is mounted on the wafer suction plate 12 and the fixing ring 56 is disposed on the ring clamp 40. The wafer 52 is fixed by the wafer suction plate 12, and the fixing ring 56 is fixed by the ring clamp 40. A handle 42 can be provided for adjusting frame size by, e.g., horizontally moving the position of the ring clamp 40.

In the chuck table 10 of the first embodiment of the present invention, in order to sense the contact of the scribing blade 20 to the wafer suction plate 12 due to the over-sawing of the scribing blade 20 on the wafer 52, the tactile sensing lines 16 are formed on the upper surface of the wafer suction plate 12. In order to be electrically coupled to the tactile sensing unit 31 (FIG. 1), one end of the wafer suction plate 12 is electrically connected to the table body 14. If the scribing blade 20 over-saws the wafer 52 and contacts the tactile sensing line 16 of the chuck table, data corresponding to this occurrence are electrically communicated to the equipment stop unit 37 through the table body 14 and the tactile sensing unit 31, and the equipment stop unit 37 stops the driving of the scribing blade 20.

As shown in FIG. 7, the tactile sensing lines 16 preferably have at least one intersection point with each of all scribe lines 51, 53 of the wafer 52. After sawing the wafer 52 along horizontal scribe lines 51, i.e., first scribe lines, the scribing blade saws the wafer 52 along vertical scribe lines 53, i.e., second scribe lines. The tactile sensing lines 16 are formed on the wafer suction plate 12. The tactile sensing lines 16 comprise at least one first tactile sensing line 16a, which intersects with the first scribe lines 51, and at least one second tactile sensing line 16b, which intersects with the second scribe lines 53. The tactile sensing lines 16 may be straight or curved.

A sawing area 58 is in a rectangular shape surrounded by lines extended from four outermost scribe lines (two outermost vertical scribe lines and two outermost horizontal scribe lines). Preferably, the first tactile sensing line 16a has a predetermined length to include the vertical width of the sawing area 58 and the second tactile sensing line 16b has a predetermined length to include the horizontal width of the sawing area 58.

In order to saw various-sized wafers 52 mounted on the wafer suction plate 12 with the tactile sensing lines 16, the tactile sensing lines 16 are preferably formed to be applicable maximum-sized wafer able to be mounted on the wafer suction plate 12.

In the above-described first embodiment of the present invention, the first tactile sensing line 16a and the second tactile sensing line 16b perpendicularly intersect with each other at the center of the wafer suction plate 12. The first tactile sensing line 16a is parallel to the vertical scribe lines 53 and the second tactile sensing line 16b is parallel to the horizontal scribe lines 51.

Figure 8:
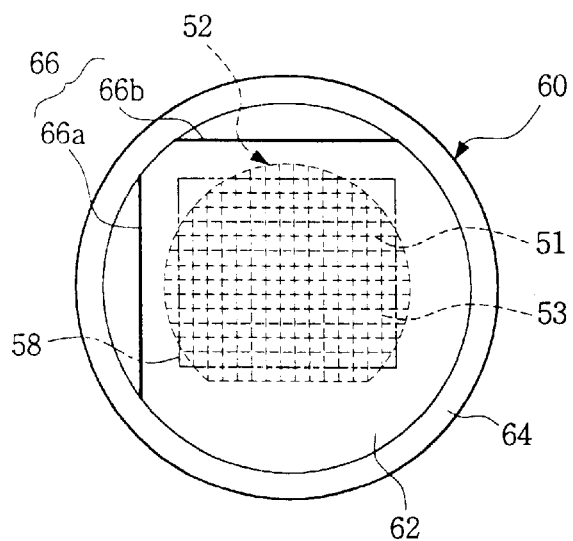
FIG. 8 is a plan view of a wafer sawing apparatus having a chuck table with tactile sensing lines in accordance with a second embodiment of the present invention.

FIG. 8 shows a chuck table 60 in accordance with a second embodiment of the present invention. Tactile sensing lines 66 comprise a first tactile sensing line 66a and a second tactile sensing line 66b. The first tactile sensing line 66a and the second tactile sensing line 66b do not intersect with each other. Also, the first tactile sensing line 66a has a predetermined length so as to include the vertical width of the sawing area 58 and the second tactile sensing line 66b has a predetermined length so as to include the horizontal width of the sawing area 58.

Figure 9:
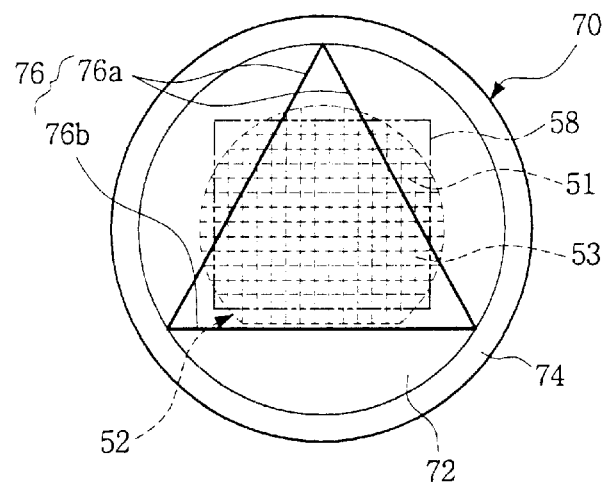
FIG. 9 is a plan view of a wafer sawing apparatus having a chuck table with tactile sensing lines in accordance with a third embodiment of the present invention.

FIG. 9 shows a chuck table 70 in accordance with a third embodiment of the present invention. Tactile sensing lines 76 comprise two first tactile sensing lines 76a and a second tactile sensing line 76b. Two first tactile sensing lines 76a and one second tactile sensing line 76b form a triangle. Also, each of the first tactile sensing lines 76a has a predetermined length so as to include the vertical width of the sawing area 58 and the second tactile sensing line 76b has a predetermined length so as to include the horizontal width of the sawing area 58.

Figure 10:
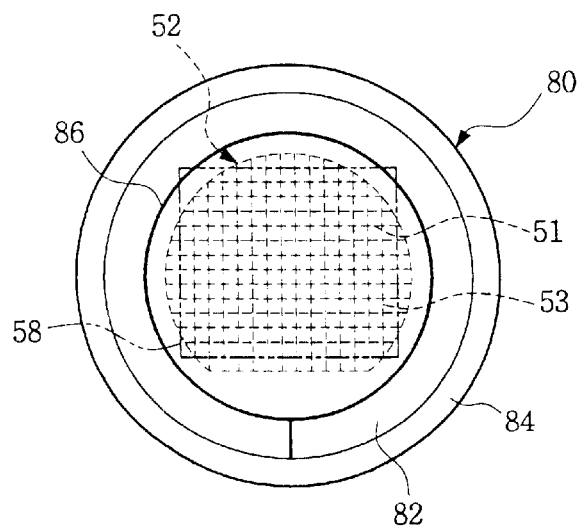
FIG. 10 is a plan view of a wafer sawing apparatus having a chuck table with tactile sensing lines in accordance with a fourth embodiment of the present invention.

FIG. 10 shows a chuck table 80 in accordance with a fourth embodiment of the present invention. A tactile sensing line 86 is circular-formed. One end of the circular tactile sensing line 86 is connected to the table body 84. The circular tactile sensing line 86 has at least one intersection point with each of the lines extended from the scribe lines 51 and 53, which are passed through by the scribing blade along the scribe lines 51 and 53 of the wafer 52.

With reference to FIGS. 1 to 7, the sawing step using the wafer sawing apparatus 100 of the present invention is described below.

First, the scribing blade 20 is adjusted in the zero point. The switching unit 33 of the controller 30 connects the tactile sensing unit 31 to zero point adjusting unit 35. Under this condition, when the scribing blade 20 on the upper surface of the chuck table 10 goes down and contacts the table body 14 of the chuck table 10, the tactile sensing unit 31 connected to the table body 14 senses this contact. Then the data of the contact are transferred into the zero point adjusting unit 35 through the switching unit 33, thereby adjusting the zero point.

In order to adjust the zero point, when the operator inputs the setup signal 121 (FIG. 3), a setup output signal 125 is changed from "1" to "0" and the relay 1 127 operates, thereby changing the relay 1-1 113 to be connected to the point B 114. In this condition, when the scribing blade 20 contacts the table body 14 of the chuck table, power is supplied to the grounded scribing blade 20 and outputted through Q3 115. Accordingly, the contact is sensed and the zero point of the scribing blade 20 is adjusted. At this time, the relay 2 117 does not operate.

After completing the zero point adjustment of the scribing blade 20, the relay 1-1 113 is returned to its earlier condition. That is, the relay 1-1 113 is changed to be connected to the point B 112 and the setup output signal 125 is changed from "0" to "1".

Next, in order to sense the contact of the scribing blade 20 to the chuck table 10 during the scribing step, the switching unit 33 of the controller 30 disconnects the tactile sensing unit 31 from the zero point adjusting unit 35, and then connects the tactile sensing unit 31 to the equipment stop unit 37.

As shown in FIG. 3, when the operator inputs the start signal 123, the setup output signal 125 is changed from "1" to "0" and the relay 1 127 operates, thereby changing the relay 1-1 113 to be connected to the point B 114 and returning the tactile sensing circuit 110 into the stand-by condition.

The wafer ring 56 with the wafer 52 attached thereto is mounted on the chuck table 10. The wafer suction plate 12 retains the wafer 52, and the ring clamp 40 fixes the wafer ring 56.

The chuck table 10 moves in X-axis and Y-axis directions so that that the wafer 52 is aligned in a proper position to be sawed by the scribing blade 20. The scribing blade 20 then is positioned adjacent the wafer 52, and sawing of the wafer 52 is begun.

If the scribing blade 20 over-saws the wafer 52 and contacts the tactile sensing lines 16 of the wafer suction plate 12 of the chuck table 10, the tactile sensing unit 31 senses the contact through the table body 14 connected to the tactile sensing line 16. Data corresponding to this contact are transferred into the equipment stop unit 37 through the switching unit 33. The equipment stop unit 37 stops the driving of the scribing blade 20, thereby preventing the wafer suction plate 12 and the wafer 52 from being damaged.

In the contact sensing circuit 110 in the stand-by condition, when the scribing blade 20 contacts the table body 14 or the contact sensing lines 16 of the chuck table 10, power flows into the grounded scribing blade 20. Then, power is outputted through Q3 115 and the relay 2 117 operates, thereby closing the relay 2-1 133 and stopping the driving of the scribing blade 20. Thereby, the wafer plate 12 and the wafer 52 are prevented from being further damaged.

The operator also can stop the driving of the wafer sawing apparatus 100 by closing switch 131 of the equipment stop circuit 130.

In accordance with the preferred embodiments of the present invention, since the tactile sensing lines on the chuck table senses a contact of the scribing blade with the wafer suction plate of the chuck table due to the over-sawing of the scribing blade on the wafer, the wafer sawing apparatus of the present invention prevents wafer cutting failures and prevents the chuck table from being damaged by a scribing blade.

Although the preferred embodiments of the present invention have been described in detail hereinabove, it should be understood that many variations and/or modifications of the basic inventive concepts herein taught which may appear to those skilled in the art will still fall within the spirit and scope of the present invention as defined in the appended claims.

What is claimed is:

1. A wafer sawing apparatus comprising: a chuck table including:
   - a wafer suction plate for mounting a wafer;
   - an electrically conductive table body surrounding said wafer suction plate; and
   - one or more tactile sensing lines being formed on the upper surface of said wafer suction plate, at least one end of one of said tactile sensing lines being electrically connected to said table body;
   - a scribing blade for sawing said wafer; and
   - a controller for controlling said chuck table and said scribing blade, said controller being electrically connected to said table body of the chuck table and said scribing blade, said controller comprising:
     - a tactile sensing unit for sensing the contact of said scribing blade with said tactile sensing lines or said table body, said tactile sensing unit being connected to said table body; and
     - an equipment stop unit for stopping the driving of said scribing blade by receiving a signal of said contact of the scribing blade with the tactile sensing lines from said tactile sensing unit.

2. The wafer sawing apparatus as claimed in claim 1, wherein said controller further comprises:
   - a zero point adjusting unit for receiving said signal of the contact from said tactile sensing unit and for adjusting a zero point of said scribing blade; and
   - a switching unit for opening or closing a connection between said tactile sensing unit and said zero point adjusting unit or a connection between said tactile sensing unit and said equipment stop unit, wherein said switching unit connects said tactile sensing unit to said zero point adjusting unit during zero point adjustment and said switching unit connects said tactile sensing unit to said equipment stop unit during wafer sawing.

3. The wafer sawing apparatus as claimed in claim 1, wherein said tactile sensing lines comprises:
   - at least one first tactile sensing line intersecting with horizontal scribe lines along which said scribing blade saws the wafer; and
   - at least one second tactile sensing line intersecting with vertical scribe lines along which said scribing blade saws the wafer.

4. The wafer sawing apparatus as claimed in claim 2, wherein said tactile sensing lines comprises:
   - at least one first tactile sensing line intersecting with horizontal scribe lines along which said scribing blade saws the wafer; and
   - at least one second tactile sensing line intersecting with vertical scribe lines along which said scribing blade saws the wafer.

5. The wafer sawing apparatus as claimed in claim 3, wherein said first tactile sensing line is substantially perpendicular to said horizontal scribe lines of the wafer and said second tactile sensing line is substantially perpendicular to said vertical scribe lines of the wafer.

6. The wafer sawing apparatus as claimed in claim 4, wherein said first tactile sensing line is substantially perpendicular to said horizontal scribe lines of the wafer and said second tactile sensing line is substantially perpendicular to said vertical scribe lines of the wafer.

7. The wafer sawing apparatus as claimed in claim 3, wherein said first and said second tactile sensing lines form a triangle.

8. The wafer sawing apparatus as claimed in claim 4, wherein said first and said second tactile sensing lines form a triangle.

9. The wafer sawing apparatus as claimed in claim 1, wherein said tactile sensing lines comprises:
   - a first circular tactile sensing line having a tactile sensing area greater than a scribing area formed by connecting two outermost vertical scribe lines and two outermost horizontal scribe lines of the wafer; and
   - a second tactile sensing line for connecting said first tactile sensing line to said table body.

10. The wafer sawing apparatus as claimed in claim 9, wherein said scribing area substantially overlaps said tactile sensing area.

11. The wafer sawing apparatus as claimed in claim 2, wherein said tactile sensing lines comprises:
    - a first circular tactile sensing line having a tactile sensing area greater than a scribing area formed by connecting two outermost vertical scribe lines and two outermost horizontal scribe lines of the wafer; and
    - a second tactile sensing line for connecting said first tactile sensing line to said table body.

12. The wafer sawing apparatus as claimed in claim 11, wherein said scribing area substantially overlaps said tactile sensing area.

* * * * *